Dec. 30, 1958   C. RUSSELL   2,866,930
AUTOMATIC STEERING SYSTEM
Filed June 21, 1954
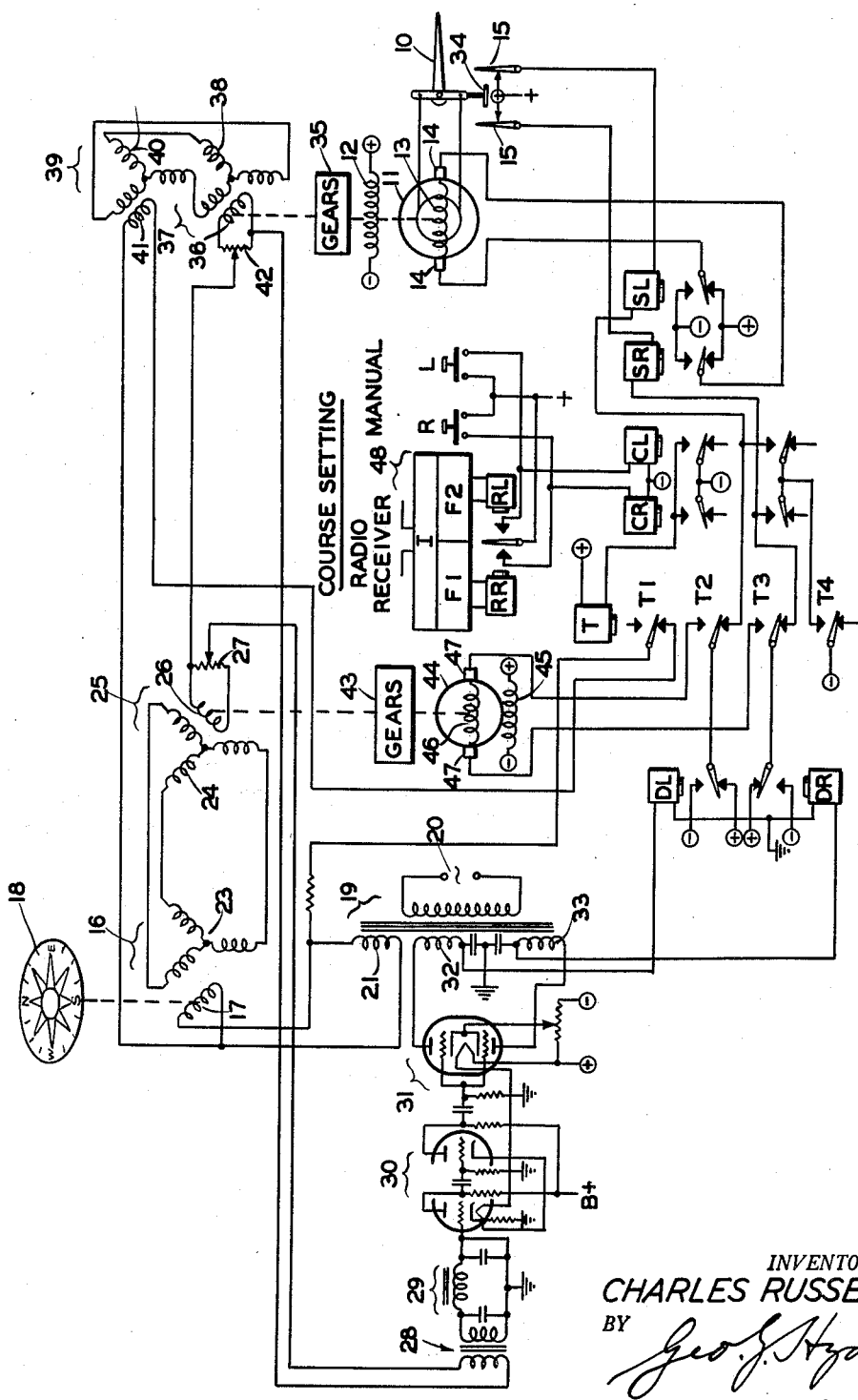
INVENTOR.
CHARLES RUSSELL
BY Geo. J. Hyde
ATTORNEY

2,866,930

AUTOMATIC STEERING SYSTEM

Charles Russell, Milldale, Conn., assignor to Bendix Aviation Corporation, Teterboro, N. J., a corporation of Delaware Application June 21, 1954, Serial No. 438,142

16 Claims. (Cl. 318—16)

This invention relates to automatic steering systems for dirigible craft, and particularly to systems in which the steering element, such as a rudder, is automatically operated to maintain the craft on a selected course by a control unit responsive to a compass and set for such course, being actuated by deviations from the course to operate the rudder so as to correct such deviation.

An object of the invention is to provide a novel arrangement for changing the course setting, and more specifically an arrangement that can be electrically operated from a remote station.

Another object is to provide a control system in which the course is reset in conformity with a deliberate change in direction of the craft. This is in general accomplished by a system which includes an arrangement for changing the course by actuating the steering mechanism independently of the control arrangement, and automatically resetting the control unit to conform to the actual direction of the craft, so that the desired new course is set merely by discontinuing the resetting actuation when the craft is on such course. This arrangement makes it possible to reset the course merely by independent operation of the steering mechanism, which is readily accomplished from a distance by a simple circuit or by radio.

An object therefore is to provide an automatic steering system which maintains a set course and in which the course may be reset by radio control, or more specifically by radio control of steering.

Systems of this type may include an electrical course setting unit responsive to direction signals from the compass, and an automatic steering unit controlled by deviation signals from the course set by the setting unit, including a follow-up element that operates the steering element in accordance with such signals, returning the element toward neutral as the deviation decreases, thereby avoiding overshooting. An object of the invention is to provide automatic course resetting in a system of this type by operating the steering device to change the actual course to the one that is desired. This is in general accomplished by a resetting arrangement that not only operates the steering device, but also disables the follow-up unit and energizes an arrangement for resetting the course setting unit in accordance with direction signals from the compass.

Another object is to perform one or more of the indicated operations by improved electrical circuit arrangements, using standard elements, and more particularly utilizing a novel relay system.

These and other objects and advantages of the invention will appear more fully from consideration of the detailed description which follows, in conjunction with the accompanying drawing wherein one embodiment of the invention is illustrated. It is to be expressly understood, however, that the drawing is for the purposes of illustration and description and is not to be construed as defining the limits of the invention.

The drawing is a diagram of the circuits and elements constituting one embodiment of the invention. In this illustrative embodiment the course of the chaft is controlled by a rudder, such as that which is used on boats. As shown, the rudder 10 is operated by D. C. reversible motor 11 having a continuously energized winding 12 and a winding 13 selectively energized through brushes 14, both connected to a positive source through the outer contacts of the right steering relay SR and the left steering relay SL, the inner contacts of which are connected to a negative source. This arrangement provides dynamic braking for motor 11.

The steering relays SR and SL are connected at one side through armatures and contacts of other relays hereafter described to the armatures of automatic deviation correcting relays DL and DR, normally engaging the outer contacts of these relays, which contacts are connected to the positive source. The other sides of steering relays SR and SL are also connected through limit switches 15 to the positive source, so that the latter relays normally are not energized.

An arrangement is provided for selectively actuating the automatic stering relays SR and SL in accordance with deviations from a set course. The course setting circuit includes a compass-controlled synchro transmitter 16 having a rotor 17 positioned by a compass system 18 in well known manner in accordance with the direction of the craft. Rotor 17 is energized from a suitable source of alternating or pulsating current, provided in the illustrated embodiment by a transformer 19 connected to alternating current source 20 and having a secondary 21 connected across the rotor 17.

The stator 23 of compass synchro 16 is connected in parallel to the stator 24 of course setting synchro 25, the stators being shown as of the Y-connected type. Rotor 26 of synchro 25 is angularly set manually or by an arrangement hereafter described in accordance with the desired course to be followed by the craft. Rotors 17 and 26 are oriented so that when the compass 18 indicates the course for which rotor 26 is set, the latter rotor will be in null position, and therefore no voltage will be induced across it.

An arrangement is provided for selectively energizing the deviation relays DL and DR when the craft deviates from the set course. When this occurs, a voltage will be developed across rotor 26, the phase of the voltage depending upon whether the deviation is to the right or to the left. A suitable amplifying and phase sensitive circuit is provided for applying this voltage selectively to one of the latter relays. In the form shown, the voltage, which may be adjusted by potentiometer 27, is applied to input transformer 28, and passes through a filter 29 and a two-stage amplifier 30 to a phase discriminating circuit 31 including secondary windings 32 and 33 of transformer 19, arranged so that, when the phase applied to circuit 31 corresponds to a deviation to the left, winding 32 will be energized and will actuate relay DL through which it is connected to ground, while if the phase is the opposite one caused by deviation to the right, winding 33 will energize relay DR through which it is connected to ground. The inner contacts of these relays are connected to a negative source, so that when one of them is energized, it will energize the corresponding steering relay SR or SL to drive motor 11 and swing rudder 10 in the proper direction to correct the deviation, the rudder being prevented from overswinging by the extension 34 which will contact and open one of the limit switches 15 at the proper rudder angle, deenergizing the appropriate steering relay SR or SL.

An arrangement is provided for bringing the rudder 10 back toward central neutral position as the craft returns to its course. This includes an electrical follow-up system which will appropriately control the energizing of the deviation relays DL and DR. As illustrated, motor 11 is connected through suitable reduction gearing 35 to the rotor 36 of follow-up synchro 37, whose stator 38 is appropriately energized from secondary 21. For this purpose it has been found advantageous to employ a transformer synchro 39 having a stator 40 connected in parallel to stator 38, and a rotor 41 fixed in position relative to stator 40, connected across secondary 21. Synchros 37 and 39 are preferably of the type having three phase Y-connected stators and single phase rotors, as shown. The rotor 36 is located in null position when rudder 10 is in central or neutral position.

The arrangement is such that the phase of the voltage across rotor 36 will oppose the phase of the output from rotor 26 of the course setting synchro 25, the two rotors being connected in series across the input transformer 28, a potentiometer 42 being provided across rotor 36 for appropriate adjustment of the voltage output. With this arrangement, when the craft deviates from its course, a voltage is developed across rotor 26 having an amplitude corresponding to the extent of deviation, and a phase corresponding to the direction of deviation, which actuates the appropriate deviation relay DR or DL to energize steering relay SR or SL and operate motor 11 to deflect rudder 10 in the proper direction to correct the course deviation. As rudder 10 swings over, rotor 36 of the follow-up synchro will be rotated from null position, and a voltage will be developed across rotor 36 corresponding in amplitude to the extent of rudder deflection, and in phase to its direction, the phase generated in rotor 36 being opposite to the phase developed across course setting rotor 26. Consequently the voltage applied to input transformer 28 will be reduced as the rudder swings over, the rotor 36 voltage increasing and the rotor 26 voltage diminishing as the craft swings back toward the set course, until the two voltages are substantially equal the deviation relay drops and motor 11 stops with dynamic braking. However, as the rudder is still deflected and the craft continues to turn, the voltage across rotor 26 will decrease and the voltage across rotor 36 will thereupon energize the other relay DL or DR, operating motor 11 to return rudder 10 toward neutral position. This will continue progressively until the vessel is on course and no voltages appear across rotors 26 and 36.

An arrangement is provided for resetting rotor 26 of course setting synchro 25 in accordance with a desired new course for the craft. For this purpose rotor 26 is connected through suitable reduction gearing 43 to a course changing reversible D. C. motor 44 having a winding 45 permanently energized from suitable positive and negative sources, and a winding 46 selectively energizing through brushes 47 from a suitable control source.

As shown, this source in accordance with one feature of the invention is responsive to changes in the direction of the craft, and utilizes the automatic steering control circuit already described to operate motor 44. The arrangement includes a transfer relay T having four armatures, with inner and outer contacts for each. The armature T1 and its outer contact are connected in series with the circuit between transformer synchro rotor 41 and secondary 21, so that when relay T is energized, transformer synchro 39 and follow-up synchro 37 are deenergized. Consequently no bucking signal from rotor 36 is applied during course resetting to input transformer 28, which receives only the signal from course setting synchro rotor 26, generated by changes in the position of the compass-controlled rotor 17 which follow the changes in the craft direction. The second and third armatures T2 and T3 of relay T are connected through the armatures and outer contacts of relays DL and DR to a positive source. The outer contacts of armatures T2 and T3 are connected to the input sides of steering relays SL and SR respectively.

With this arrangement, when the transfer relay T is energized and the automatic steering relays DL and DR are actuated solely by deviations of the compass rotor 17 from the setting of rotor 26 as the direction of the craft changes, the proper signal from rotor 26 will be transmitted through input transformer 28 to actuate either relay DL or DR, depending upon the direction in which the course changes, in the manner already described. The inner contacts of the latter relays are connected to a negative source; so that when one of them is energized, for instance relay DL, the negative source will be connected through armature T2 and its inner contact to a brush 47 of motor 44, the other brush 47 being connected through armature T3 and its inner contact to the outer contact of DR and the positive source, driving motor 44 in the appropriate direction to turn rotor 26 to a position corresponding to the changed position of the compass synchro rotor 17. In this manner rotor 26 will be maintained in a position corresponding to that of rotor 17, following the latter as the direction of the craft changes. Obviously the same operation will take place if the course is changed in the opposite direction, applying the other phase from rotor 26 to input transformer 28, and actuating the other deviation relay, such as DR. When the desired course is reached and transfer relay T is deenergized, brushes 47 of motor 44 will be disconnected, transformer 39 and follow-up synchro 37 will be re-energized, and the automatic steering control will take over, operating rudder 10 to keep the craft on the course on which it was headed when relay T was deenergized.

While for resetting the course as described up to this point it is necessary only to change the direction of the craft, either by operation of rudder 10 directly in any desired manner or by other means, a feature of the invention is the utilization of the steering circuit, including steering relays SR and SL, for this purpose. This is advantageously correlated with the energizing of transfer relay T.

In the form shown, two control relays, CR and CL, are employed, connected so that when energized they will selectively shift the rudder 10, reset the course to the right or to the left respectively, and energize transfer relay T. Each of the relays CR and CL has two armatures with inner and outer contacts. The inner armatures of both relays have outer contacts connected to the negative source, and inner contacts connected to one end of the winding of transfer relay T, the other end of which is connected to the positive source. With this arrangement the energizing of either relay, CR or CL, will energize transfer relay T.

The outer armatures of relays CR and CL are connected to the inner contact of armature T4 of relay T, and the armature T4 is connected to a negative source. The inner contact of the outer armature of relay CR is connected at one side through the outer contact of armature T3 and the outer contact of relay DR to a positive source, while the inner contact of the outer armature of relay CL is connected through the outer contact of armature T2 and the outer contact of relay DL likewise to a positive source.

With this arrangement, when one of the control relays CR or CL is energized, for instance CR, its inner armature will energize the transfer relay T, putting into operation the automatic course setting circuit, and shifting armature T4 to its inner contact. The outer armature of control relay CR will then complete the connection to the negative source, which will be applied to the steering relay SR and operate motor 11 to shift rudder 10 and change the course of the craft to the right, simultaneously resetting the course by shifting rotor 26 in the manner already described. This operation will continue as long as relay CR is energized.

It is noted that since the armatures of the automatic steering relays DL and DR are connected through transfer armatures T2 and T3 to the resetting motor 44, the latter relays will have no effect on the operation of the steering motor 11 while relay CR is in operation. However, as soon as relay CR is deenergized, transfer relay T will be deenergized and the automatic steering control will be in operation, returning the rudder 10 from its deflected position and correcting the inevitable overshooting of the course on which the craft was headed, for which rotor 26 was set when the relay CR was deenergized. Obviously the same operation in the opposite direction takes place when the other control relay, CL, is energized.

A suitable arrangement for selectively energizing either relay CR or relay CL at the will of the operator is provided, and may include either local or remote switching arrangements. Moreover, such arrangements may readily be actuated by radio. In the form illustrated, for manual operation one side of the windings of relays CR and CL is connected to a negative source, the other side being selectively connected through manually operated switches R and L to a positive source.

An arrangement for radio control is diagrammatically shown, and includes a radio receiver 48 actuated by signals of two different types to energize selectively a polarized relay system, shown as including relay units RR and RL, having an armature connected to the positive source and inner contacts connected to control relays CR and CL. Various well known radio receiver circuits are available through which the relay units RR and RL can be selectively operated. For instance, the receiver 48 may have an input circuit I receiving waves of different frequencies which are separated in filters or tuned circuits F1 and F2 provided with suitable amplifiers and rectifiers, their outputs being connected to the relay units RR and RL respectively. A circuit suitable for this purpose forms part of the disclosure of the patent to Green et al., No. 2,039,904, issued May 5, 1936.

The operation of the various parts of the disclosed arrangement has been described in connection with these parts, and therefore only the general functioning of the system will be set forth. When the system is in normal operation, with the craft on a set course, none of the control circuits will be energized and both motors will be stationary under dynamic braking, with the rudder 10 in neutral position. When the craft deviates from its course, the automatic steering control circuits will operate rudder 10 to return it to the course, the follow-up system preventing overshooting. When it is desired to change the course, the course setting relay system is selectively energized, either manually or by radio, for a change to either the right or the left, operating the motor 11 to swing the rudder 10 and change the course in the desired direction, while the course changing motor 44 will be energized to change the course setting. When the craft is on the desired course, the release of the course setting system will establish the course setting in the direction in which the craft is headed, and will return the rudder to the automatic steering control, which will maintain the craft on the latter course.

This system is particularly adapted for use with boats controlled by radio from a distant point, which may be on the shore or on an aircraft. For instance, it may be used with boats carried by a dirigible to a rescue area and dropped into the water, being directed by radio from the dirigible to the rescue point.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In an automatic steering system for dirigible craft, comprising steering means, course setting means, and control means for automatically operating the steering means to maintain the craft on the course set by said setting means; follow-up means actuated by the steering means for regulating the operation of the control means, and means for simultaneously changing the setting of the course setting means and inactivating the follow-up means.

2. In an automatic steering system for dirigible craft, comprising steering means, course setting means, and control means for automatically operating the steering means to maintain the craft on the course set by said setting means; follow-up means actuated by the steering means for regulating the operation of the control means, means for changing the setting of the course setting means including a motor, means for selectively energizing the motor, and means for disconnecting the follow-up means during operation of the motor.

3. In an automatic steering system for dirigible craft, which comprises steering means, course setting means, and control means for actuating the steering means to maintain the craft on the course set by the setting means; a transmitter synchro having a rotor and a stator forming part of the control means, means for energizing the rotor from a source of cyclic current, and means for maintaining said rotor in an angular position corresponding to the course of the craft; a course setting synchro including a stator connected in parallel with the transmitter stator and a rotor set at an angular position corresponding to the desired course, the arrangement being such that no voltage is induced in the course setting rotor when the craft is on course and the phase of the voltage induced when the craft deviates from the course corresponds to the direction of deviation; a phase sensitive circuit connected to the output of the course setting rotor; and means actuated by said circuit to operate the steering means selectively to return the craft to the set course.

4. In an automatic steering system for dirigible craft, which comprises steering means including an electrical steering system, course setting means and control means for actuating the steering system to maintain the craft on the course set by the setting means; a transmitter synchro having a rotor and a stator, means for energizing the rotor from a source of cyclic current, means for maintaining said rotor in an angular position corresponding to the direction of the craft; a course setting synchro including a stator connected in parallel with the transmitter stator and a rotor set at an angular position corresponding to the desired course, the arrangement being such that no voltage is induced in the course setting rotor when the craft is on course and the phase of the voltage induced when the craft deviates from the course corresponds to the direction of deviation; a phase sensitive circuit connected to the course setting rotor, and a relay circuit normally connected to the electrical steering system and selectively energized by said phase sensitive circuit to actuate the steering means and return the craft to the set course.

5. In an automatic steering system for dirigible craft, which comprises steering means, course setting means and control means for actuating the steering means to maintain the craft on the course set by the setting means; means in the control means for generating a correction voltage corresponding in phase to the direction of a deviation from the set course and in amplitude to the extent of such deviation; means for deflecting the steering means from neutral position to correct such deviation; means for generating a follow-up voltage corresponding in phase to the direction of such steering means deflection and in amplitude to the extent of said deflection, the phase of the follow-up voltage being opposite to the phase of the correction voltage; and a control circuit operatively connected to the deflecting means, including means for applying said voltages in phase opposition to produce a resultant control voltage and for actuating the deflecting means in accordance with the phase of the control voltage, the arrangement being such that the steering means is shifted toward neutral in accordance with the phase of the differential between said voltages as the craft returns to the set course.

6. An automatic steering system for dirigible craft, comprising steering means, course setting means, and course control means for automatically operating the steering means to maintain the craft on the course set by the setting means, follow-up means actuated by the steering means for regulating the operation of the control means, and means for simultaneously changing the set course by radio signal and inactivating the follow-up means, including a radio receiver and means actuated by said receiver in response to selective signals for changing the setting of the course setting means in accordance with such signals.

7. An automatic steering system for dirigible craft comprising steering means, course setting means, course control means for operating said steering means to maintain the craft on the course set by the setting means follow-up means actuated by the steering means for regulating the operation of the control means, and means for changing the set course by radio signal including a radio receiver selectively responsive to two different signals, one for each direction of change, means actuated by the receiver in response to a signal for actuating the steering means to change the course of the craft in the direction corresponding to the signal and resetting means actuated by the receiver in response to said signal for resetting the course setting means in conformity with said signal and for simultaneously inactivating said follow-up means during the resetting.

8. An automatic steering system for dirigible craft comprising steering means, course setting means and course control means for automatically operating said steering means to maintain the craft on the course set by the setting means, follow-up means actuated by said steering means for regulating the operation of the control means, and means for changing the set course by radio signal, including a radio receiver selectively responsive to two different signals, one for each direction of change, means actuated by the receiver in response to a signal for actuating the steering means to change the course of the craft in the direction corresponding to the signal and means for resetting the course setting means in accordance with the change in direction of the craft resulting from said actuation of the steering means and for simultaneously inactivating said follow-up means during said resetting.

9. An automatic steering system for dirigible craft comprising steering means, course setting means, and control means for automatically operating said steering means to maintain the craft on the course set by the setting means, follow-up means actuated by said steering means for regulating the operation of said control means, and means for changing the set course by radio signal including a radio receiver selectively responsive to two different signals, one for each direction of change, means actuated by the receiver in response to one of the signals for actuating the steering means to change the course of the craft in the direction corresponding to the signal, an actuating circuit in the course control means normally connected to the steering means, and switch means responsive to said receiver actuated means for transferring the connection of said actuating circuit from the steering means to the course setting means and for simultaneously inactivating said follow-up means.

10. In an automatic pilot system for aircraft, comprising power means for operating a control surface of said craft, control means for automatically operating said power means to maintain said craft on a reference, follow-up means actuated by said power means for regulating the operation of the control means, reference setting means, and means for simultaneously changing the setting of the reference setting means and inactivating the follow-up means.

11. An automatic pilot system for dirigible craft, comprising power means for maneuvering the craft, control means for automatically operating said power means to maintain the craft on a reference including follow-up means actuated by the power means, reference setting means, means for changing the setting of the reference setting means including motor means and means for selectively operating said power means and motor means for rendering said follow-up means inoperative during operation of said motor means.

12. In an automatic control system for aircraft, comprising steering means, course setting means, control means for automatically operating the steering means to maintain the craft on the course set by said setting means, follow-up means actuated by said steering means for regulating the operation of the control means, and means for simultaneously changing the setting of the course setting means and inactivating the follow-up means including a radio receiver and means actuated by said receiver in response to selective signals for changing the setting of the course setting means in accordance with such signals.

13. An automatic control system for aircraft comprising power means for operating a surface of the craft, a plurality of signal means, means responsive to deviation of the craft from a set direction for actuating a first of said signal means, follow-up means responsive to the displacement of said surface from a normal position for actuating a second of said signal means, said first and second signal means normally operating said power means to maintain the craft in said set direction, third means for actuating the power means to change the direction of the craft including means for simultaneously maintaining the course setting in conformity with the changed direction of the craft changing means and rendering said second means inactivated during operation of said power means by said third means.

14. An automatic control system including means for developing a signal corresponding to the difference between the actual course of the craft and a preset course, a servomotor operable by said signal to displace a control surface of the craft to bring said craft to the preset course, follow-up means actuated by said servomotor for developing a signal to oppose the operation of said servomotor whereby the extent of operation of said servomotor corresponds to the extent of deviation of the craft from said preset course, independent means for actuating said servomotor to change the craft's course, means operative during operation of said independent means for maintaining said preset course in synchronism with the actual course and rendering said followup means inoperative.

15. An automatic steering system for a craft comprising power means, direction responsive means, course setting means, means responsive to the difference between said direction responsive and course setting means for operating said power means to maintain the craft on the course set by said setting means, follow-up means actuated by said power means for making the extent of operation of said power means correspond to the extent of said difference and means for changing the setting of the course setting means including a motor and means for selectively activating said motor and inactivating the follow-up means.

16. An automatic steering system for aircraft comprising power means for moving a control surface, first signal means having two displaceable parts, heading responsive means for displacing one of said parts, course setting means for displacing the other of said parts whereby the signal developed by said signal means is the difference between the heading and set course, second signal means actuated by said power means for developing a signal corresponding to the extent of operation of said power means, means connecting said signal means to said power means in opposed relationship to provide a resultant signal for the operation of said power means, and further means for operating said power means including means for maintaining said two parts in positional agreement and means for rendering said second signal means ineffective to develop a signal during operation of said power means by said further means.

References Cited in the file of this patent

UNITED STATES PATENTS

| | | |
|---|---|---|
| Re. 16,181 | Hammond | Oct. 6, 1925 |
| 1,522,883 | Hammond | Jan. 13, 1925 |
| 1,924,857 | Hodgman | Aug. 29, 1933 |